United States Patent [19]

Evyan et al.

[11] Patent Number: 4,873,748
[45] Date of Patent: Oct. 17, 1989

[54] BURNISHED END SHIRRED CASING STICK, METHOD AND APPARATUS

[75] Inventors: John J. Evyan, Blytheville, Ark.; Orville D. Booth, Louden, Tenn.

[73] Assignee: Viskase Corporation, Chicago, Ill.

[21] Appl. No.: 229,661

[22] Filed: Aug. 8, 1988

[51] Int. Cl.⁴ ............................................. A22C 13/02
[52] U.S. Cl. ............................................. 17/49; 17/45; 17/33; 17/34; 138/118.1; 493/291; 53/581; 206/802
[58] Field of Search .................... 17/49, 42, 41, 35, 38, 17/33, 34, 45; 138/118.1, 109; 428/36; 206/802, 525; 493/308, 287, 288, 291; 53/581

[56] References Cited

U.S. PATENT DOCUMENTS

| | | | |
|---|---|---|---|
| 3,162,893 | 12/1964 | Townsend | 17/34 |
| 3,544,339 | 12/1970 | Majewski et al. | 99/176 |
| 4,033,382 | 7/1977 | Eichin | 138/118.1 |
| 4,307,488 | 12/1981 | Lofland et al. | 17/42 |
| 4,484,679 | 11/1984 | Liekens et al. | 206/303 |
| 4,525,984 | 7/1985 | Kollross | 17/49 |
| 4,536,175 | 8/1985 | Arnold | 17/34 |
| 4,594,274 | 6/1986 | De Jong et al. | 17/45 |
| 4,624,873 | 11/1986 | De Jong et al. | 17/45 |

FOREIGN PATENT DOCUMENTS 3543740 11/1986 Fed. Rep. of Germany .......... 17/49

Primary Examiner—Willis Little
Attorney, Agent, or Firm—Roger Aceto

[57] ABSTRACT

A shirred stick of cellulosic casing having an open end formed to a desired profile by burnishing. A portion of the surface of the stick bore adjacent the open end is part of the desired profile. The burnishing action forms the stick end to a surface of revolution which is symmetrical about the longitudinal axis of the stick.

24 Claims, 2 Drawing Sheets

BURNISHED END SHIRRED CASING STICK, METHOD AND APPARATUS

TECHNICAL FIELD

The present invention relates to a method of making a shirred food casing and more particularly to a shirred casing having a formed end surface to facilitate use of the casing on an automatic stuffing machine.

BACKGROUND

Casings most commonly used for manufacturing frankfurters and the like comprise relatively long thin-walled tubes of regenerated cellulose. These tubes are made by extruding and then coagulating a viscose solution. For convenience of handling, the casings, which may be 20 to 70 meters or more in length, are shirred and compressed to produce what are commonly referred to in the art as "shirred casing sticks". A shirred stick which measures about 20 to 70 centimeters in length may contain upwards of 70 meters or more of casing.

Each shirred stick has an axial bore open at one end (usually the last shirred end of the stick) so the stick can be loaded onto a stuffing horn. The opposite end of the bore is closed to prevent loss of food emulsion which is extruded from the horn and into the casing. Processes for manufacturing cellulosic casings and for subsequently shirring them to produce the shirred sticks are well known in the art and will only be described herein in sufficient detail to facilitate an understanding of the present invention.

During the course of manufacturing a shirred stick, cellulosic casing from a reel or other supply is inflated and fed onto a mandrel. A shirring device gathers the casing into generally conical pleats nested one within another wherein the innerfold of each pleat is formed against the mandrel. When a desired shirred length has accumulated on the mandrel, the shirred stick is severed from the unshirred casing and is moved away from the shirring device. Subsequent operations are performed on the shirred stick while a new stick is being shirred.

For example, in one subsequent operation the shirred stick is longitudinally compacted to further reduce its length. In another operation, one end of the stick bore is closed.

Severing the shirred stick produces a "tail" of casing at the last-shirred end of the stick. During compaction this tail is longitudinally pressed against the pleats at the last-shirred end of the stick. The tail, compacted in this fashion, produces a ring of compressed casing which may disassociate or loosen from the end of the stick. This not only detracts from the appearance of the stick but also interferes with its utility by impeding the entry of a stuffing horn into and through the bore. A loose ring of compacted casing at the bore opening may become entangled or jammed about the horn. This in turn is likely to result in a casing break either during horn insertion or during stuffing. When such a break occurs, the stuffing machine must be shut down to clear the jam and to clean the stuffing machine of food emulsion which has spilled from the casing break. Due to these potential problems, a shirred stick having a loose ring of compacted casing at its open end generally is not satisfactory for use on high speed stuffing machines wherein shirred sticks are handled mechanically and are loaded automatically on the stuffing horn.

Various methods have been employed to prevent or eliminate a loose ring of compacted casing at the open end of the stick. In one conventional method, the shirring machine operator manually peels the loose ring of casing from the stick until only tightly nested pleats of shirred casing remain at the open end of the shirred stick. This method is labor intensive and not desirable.

The prevention or elimination of loose casing at the open end of the stick also is the subject of several U.S. Patents. For example, U.S. Pat. No. 3,544,339 discloses applying a thin wax coating to the pleats at the open end of the stick. This provides a wax cap which retains the integrity of the open end. U.S. Pat. No. 3,878,978 discloses a severing method including directing a stream of cold gas at the casing to render it so brittle that it severs without the formation of a tail.

U.S. Pat. No. 4,307,488 discloses a method of reforming the torn or severed last-shirred end of the stick by smoothing it during the longitudinal compacting operation. This is accomplished by closing two halves of a split frustro-conical member about the mandrel and pressing it against the last-shirred end of the stick. The member is then oscillated or rotated around the mandrel while the member longitudinally compacts the stick. The mandrel prevents entry of the member into the bore of the stick so it is not possible to smooth the bore surface adjacent the last-shirred end of the stick. Also, if the two halves do not fit tightly together, the non-mating edges of the two halves can abrade the end of the stick.

U.S. Pat. Nos. 4,594,274 and 4,624,873 disclose pressing a heated die against the end of the stick to iron loose casing against the tightly nested pleats at the open end by combination of heat and pressure. This requires temperature control to avoid excessive heating which can damage the stick end. Also, the operator must take care to avoid touching the hot die.

OBJECT OF THE INVENTION

One object of the present invention is to provide an improved method for eliminating a loose ring of casing at the last-shirred open end of the stick.

Another object is to provide an improved method for forming the last-shirred end of a shirred stick to a configuration which makes the stick more compatible than prior art methods for use on high speed automatic stuffing machines.

A further object of the present invention is to provide an improved method for eliminating a loose ring of casing at the stick open end by an operation which forms the last-shirred pleats and loose ring of casing to a smooth, continuous, coherent surface.

Still another object of the present invention is to provide a shirred stick having its open end formed to a shape which more readily facilitates entry of the stuffing horn into the bore of the stick.

Yet another object is to provide an improved apparatus for forming the open end of a shirred stick to a desired shape.

These and other objects and advantages of the present invention will become apparent from the following detailed description thereof taken in conjunction with the accompanying drawings.

SUMMARY OF THE INVENTION

In one aspect, the present invention is a method for forming an end face of a shirred casing stick to a desired profile comprising the steps of:

(a) providing a shirred stick composed of generally conical pleats of shirred cellulosic casing nested tightly together, the pleat inner folds defining a shirred stick axial bore opening through the end face;

(b) positioning a tool surface spaced from and in axial alignment with the end face, the tool surface being a negative to the desired profile and including a central pilot insertable into the stick bore;

(c) moving the tool surface and stick axially together for introducing the pilot into the bore opening and pressing the tool surface against the end face;

(d) spinning the tool surface and pilot relative to the stick in one direction about the longitudinal axis of the stick bore while maintaining a pressing relationship between the tool surface and the end face sufficient for both burnishing the end face to a profile which is substantially a positive reproduction of the tool surface and burnishing the pleat inner folds adjacent the bore opening; and (e) continuing the spinning while axially separating the tool surface and stick.

In another aspect, the invention relates to a shirred stick of cellulosic casing having an axial bore which opens through an end face of the stick, the stick being composed of generally conical pleats of shirred casing nested tightly together each of the pleats having an inner fold which defines the surface of the bore and an outer fold which defines the outer surface of the stick. In the stick of this invention, the bore surface adjacent the end face and the end face constitute portions of a smooth burnished surface of revolution having as its axis of rotation the longitudinal axis of said bore.

The invention also relates to an apparatus for forming an end face of a shirred stick to a desired profile, the stick having an axial bore opening through said end face, and said apparatus comprising:

(a) a tool rotatable about a central axis, said tool having a surface which is symetrical about said axis and is substantially a negative image to the desired profile to be formed;

(b) a central pilot extending axially from said surface and insertable into the bore opening of a said stick;

(c) means for spinning said tool and pilot in one direction about said central axis; and (d) means for pressing said surface and stick end face axially together to burnish said stick end face to a surface of revolution having said axis as its axis of rotation.

DESCRIPTIONS OF THE DRAWINGS

DESCRIPTION OF THE INVENTION

Figure 1:
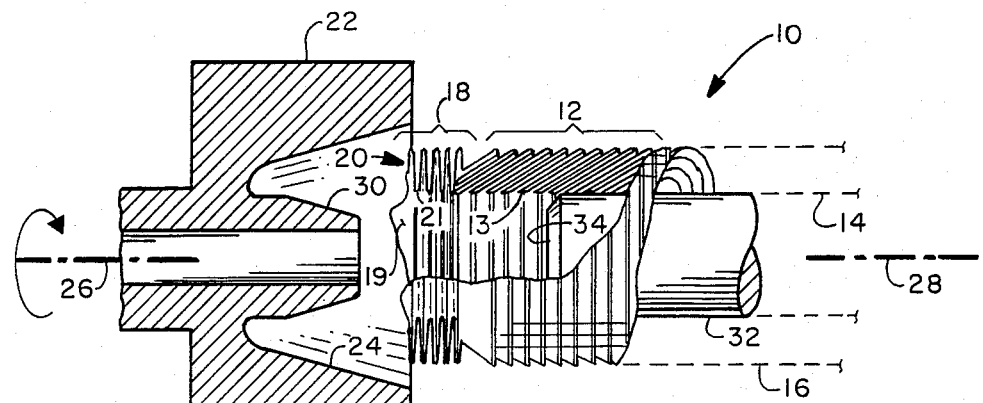
FIG. 1 is a view partly broken away and in section of a shirred casing supported in a position for treatment according to the burnishing method of the present invention.

Referring to the drawings, FIG. 1 shows a shirred stick generally indicated at 10 having an end portion 12 containing the last-shirred pleats nested tightly one against another. As mentioned above, substantially the entire stick length is composed of generally conical pleats of shirred cellulosic food casing nested tightly one with the other. The inner folds 13 of the pleats in the stick define an axial bore 14 extending longitudinally through the stick and the outer folds define the stick outer surface 16.

As shown in FIG. 1, there is a ring 18 of compacted casing which defines the terminal end face 20 of the stick. This ring is composed of the casing tail produced when casing is severed to separate a shirred stick from unshirred casing. The length of the casing in the tail may be 20 millimeters or more in length and during the compaction of the shirred casing, this tail is crushed in an accordion-like fashion against the tightly nested pleats. The resulting ring 18 does not have its casing pleats arranged in a tightly nested cone configuration and it remains relatively loose from the tightly shirred end portion 12. As mentioned above, such a ring of compacted casing may disassociate from the end of the stick and detracts from the effective use and appearance of the stick. It also is possible for the severed end of the tail to have a flap 19 which extends from the end face 20. The flap may occlude a part of the bore opening so the existence of such a flap will increase the likelihood of interference with the proper insertion of a stuffing horn into the bore 14.

In accordance with the present invention, the loose ring of compacted casing 18 is eliminated by pressing a rotatable tool surface against the stick end face 20 and spinning the tool surface relative to the stick in one direction about the longitudinal axis of the stick. This provides a burnishing action in which the continuous rubbing in one direction smooths together the loose ring 18 and the tightly nested pleats of the end portion 12 to transform the loose ring 18 to a continuous, substantially smooth end surface coherent with the end portion 12. Thus as used herein, the term "burnishing" should be understood to mean rubbing with a smooth hard surface to shape or form the loose casing 18 at the end face 20 to a desired profile and provide it with a polished or shinny appearance. Since the casing at the end face 20 initially is loose, rotation of the tool 22 in one direction insures that as the casing begins to smooth down against the tightly nested pleats of end portion 12, the casing is not lifted by a reversal of the direction of rotation.

Figure 2:
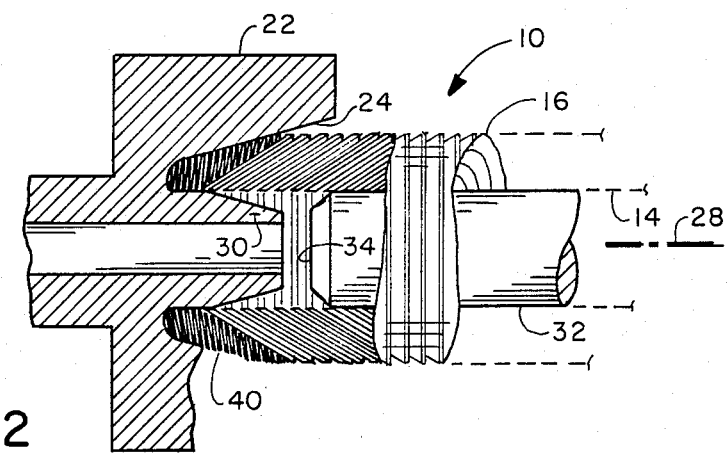
FIG. 2 is a view similar to FIG. 1 showing the stick as it is being treated.

To accomplish the burnishing action, FIG. 1 shows a tool 22 having a smooth, hard burnishing surface 24. This surface is symmetrical about the tool axis 26 and preferably is generally concave. The tool is rotatable about its axis 26 in one direction to provide the rotational rubbing which burnishes the end face 20 of the stick to a surface of revolution. This surface of revolution identified at 40 in FIG. 2 is a positive contour to the contour of the tool burnishing surface 24 and has as its axis of rotation, the longitudinal axis 28 of the stick.

The burnishing action is exothermic and preferably, the tool is made of a heat conducting, low friction material such as a polished stainless steel. Such a tool will function as a heat sink so that the stick end is not degraded by the frictional heat generated between the spinning tool and stick end.

In order to form the burnished surface of revolution, consideration must be given to the speed of rotation of the tool, the time it remains in contact with the stick end and the pressure with which the tool and stick are pressed together. Also, the surface of the shirred stick may be covered or impregnated with such substances as water or mineral oil. These conventionally are applied during the course of shirring to moisturize the casing and facilitate shirring. The presence of such substances should be taken into consideration when determining the speed, time and pressure factors for forming the burnished surface. For example, mineral oil applied to facilitate shirring and present on the end face will act as a lubricant. This may require an increase in the bearing pressure, a higher speed or a longer retention time of the tool face against the stick in order to form the burnished surface. Other substances conventionally applied to casing, such as a liquid smoke, will increase friction and may require a reduction in the bearing pressure, speed or time of contact.

Care should be taken in selecting the speed, time and pressure parameters to prevent damage to the casing of ring 18 and the end portion 12. For example, prolonged rubbing under high bearing pressure could result in the formation of pin holes in the casing or otherwise degrade the casing. Generally, it has been found that when using a polished stainless steel burnishing tool, a rotational speed of about 2500 RPM to 2900 RPM, a bearing pressure against the stick end face 20 of about 35 to 50 gm/mm$^2$ (50 to 70 psi) and time of about 3 to 4 seconds are sufficient to burnish the stick end without damaging the casing. In any event, with the foregoing in mind it would be well within the skill of the art to determine the parameters of speed, time and pressure for burnishing the end of shirred sticks made in accordance with the present invention.

Using a burnishing tool 22 to form the loose ring 18 to a smooth, continuous surface coherent with the tightly nested pleats of end portion 12 affords the opportunity to alter the profile of the stick end. For example, the tool burnishing surface 24 can be rounded so as to form the stick end to a more rounded hemispherical configuration to improve stick appearance.

To practice the method of this invention, the tool is provided with a central hub or pilot 30 which enters and bore opening. The pilot performs several functions. It maintains the diameter of the bore opening by preventing the inner folds 21 of the loose ring and adjacent tightly nested pleats from bulging inwardly into the bore as the concave tool surface presses against the stick end face 20. It also burnishes the bore surface adjacent the end face 20. Should the flap 19 fold into the bore opening, the pilot 30 will press and burnish it to the bore surface. The pilot also can be used to provide a flare or chamfer to the bore opening to facilitate the entry of a stuffing horn.

It has been found that when a hub or pilot is used to burnish and shape the bore opening, the tool should continue spinning as the tool and stick are separated. Otherwise, the pilot becomes lodged in the bore opening so the end of the stick is broken off and pulled away from the stick when the pilot is withdrawn from the bore.

FIG. 1 shows the shirred stick 10 supported internally by a member 32 extending into the stick bore. The member preferably is, but need not be, the mandrel about which the stick was formed. For example, the support can be provided by a dowel or rod inserted into the bore 14 of the stick after doffing the stick from the shirring/compaction mandrel. As an alternative, the stick can be supported externally by an elongated clamp (not shown) which grips about the outside surface of the stick. In either case, the end face 20 of the stick should be unsupported so it can be contacted by the burnishing tool 22. For example, as shown in FIG. 1, the end face 20 overhangs the end 34 of the internal support member 32 so that the loose ring 18 and a portion of the tightly nested pleats contained in stick end portion 12 are unsupported.

For purposes of burnishing the stick end face 20 to a desired shape, the rotatable tool 22 is provided with generally concave surface 24 which is a negative image of the desired shape to be formed at the terminal end face 20. The hub or pilot 30 upstands from the center of surface 24 and the tool axis of rotation 26 is aligned with the bore axis 28 so the pilot can be inserted into the bore.

In operation, the tool 22 and stick 10 are axially aligned as described and then are moved together as shown in FIG. 2. This can be accomplished by any suitable means (not shown) which either moves the tool towards the stick or moves the stick towards the tool, or which simultaneously moves both, one towards the other.

This relative longitudinal movement between the tool and stick causes the pilot 30 to enter the bore opening and the tool surface 24 to press against the stick end face 20. The tool is spun continuously at a relatively high speed in one direction about the longitudinal axis 28 of the stick bore as it moves against the end face 20. High speed rotation continues while maintaining the pressing relationship between the tool and the stick end face. Continuous rotation in one direction provides the rubbing action for burnishing the loose ring 18 to a smooth surface 40 which is substantially a positive reproduction of the tool surface 24 and which is coherent with the tightly nested pleats of end portion 12. In addition, the entering of the pilot 30 into the bore and the spinning of this pilot within the bore of the stick will burnish the inner folds 21 of the loose ring and the adjacent pleat inner folds 13 to a smooth coherent bore surface adjacent the bore opening. Should the loose flap 19 enter the bore, it too will be integrated into the smooth bore surface by the burnishing action.

The spinning tool is maintained against the stick end face 20 to burnish and form the stick end face with the desired shape. While continuing to spin the tool in one direction, the tool and stick are axially separated to withdraw the pilot 30 from the stick bore.

Figures 3, 4:
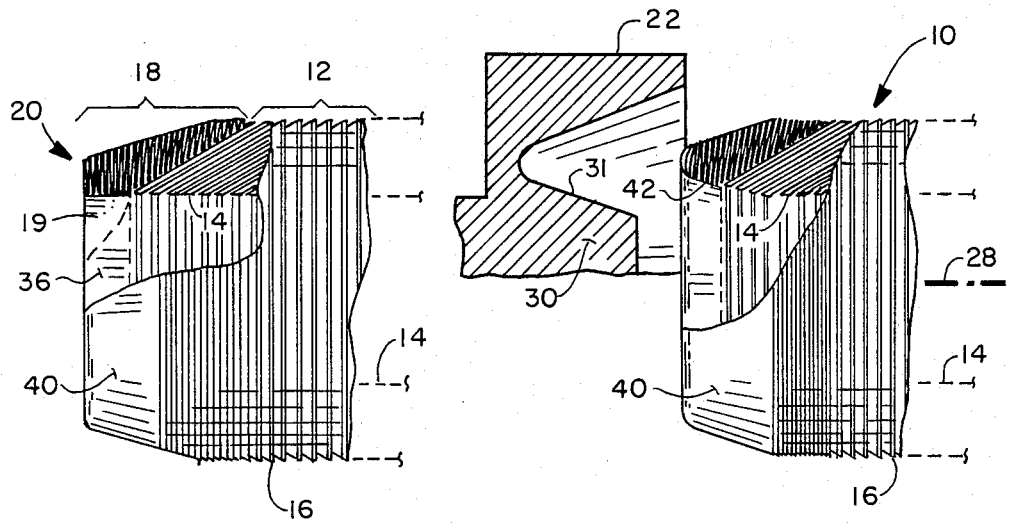
FIG. 3 is a view on an enlarged scale partly broken away and in section showing the open end of a shirred stick which is burnished according to the present invention.
FIG. 4 is a view similar to FIG. 3 showing another embodiment of the invention.

The results of burnishing the stick end face 20 are illustrated in FIG. 3. The heretofore loose ring 18 defining the stick end face 20 (FIG. 1) has been formed to a smooth, burnished surface 40. This surface 40 is generally a positive image to the tool surface 24 and is coherent to the end portion 12 of the shirred stick, thereby enhancing both the utility and appearance of the stick. A portion 36 of the stick bore surface which is adjacent the bore opening, also is burnished to a smooth, coherent cylindrical surface. This portion of the bore surface may incorporate the flap 19 which previously was loose from the end face (FIG. 1). It should be appreciated that the burnished portion 36 of the bore surface constitutes part of the burnished end surface 40 so that a smooth substantially burnished surface of revolution is formed which extends from within the stick bore 14 to the outer surface 16 of the stick 10.

In the embodiment as shown in FIG. 4, the inlet to the bore 14 is provided with a slight chamfer or beveled surface 42. This chamfer can facilitate the entry of a stuffing horn into the bore and constitutes a part of the burnished end surface 40. The chamber is formed by providing the tool 22 with a pilot 30 having a continuously tapered outer surface 31 as shown in FIG. 4.

EXAMPLE

To demonstrate the present invention, a frankfurter-size cellulosic casing (16 mm inflated diameter) was shirred on a withdrawing mandrel machine using state-of-art shirring procedures for producing commercially useful shirred sticks. Severing the shirred casing produced a casing tail about 30 mm long extending from the tightly nested pleats of casing. During the subsequent compaction of the shirred casing, this tail was longitudinally compressed against the tightly nested pleats and produced a compacted ring of casing having an outside diameter of about 18.07 mm and an inside diameter of about 10.5 mm. The end of the shirred casing containing this compacted ring of casing was then positioned on a support member 32 as shown in FIG. 1 to remove internal support from the compacted ring of casing.

A stainless steel tool was used to burnish the ring of casing. The tool had a polished surface similar in configuration to the tool 22 of FIG. 1 and included a pilot which at its largest diameter measured about 10.4 mm. In use, the tool was rotated at about 2670 RPM and then pressed against the end of the stick. Rotation was in a counterclockwise direction when viewed looking towards the end face 20. The pressure exerted by the spinning tool against the end face of the shirred casing was calculated to be about 42 gm/mm$^2$ (60 psi). The spinning tool was held against the casing for about 3.5 sec and then it was moved away from the shirred casing while continuing to spin. The result as illustrated in FIG. 3 is an aesthetically appearing burnished surface 40 which is symmetrical about the axis of the stick, is slightly convex, extends into the bore of the stick opening and is coherent with the tightly nested pleats of end portion 12.

In subsequent stuffing tests, shirred sticks having burnished ends as described above were stuffed with a frankfurter emulsion using a conventional Townsend FAM stuffing machine. This is an automatic high speed stuffing machine commonly used for the production of frankfurters. These stuffing tests confirmed that the shirred sticks having burnished ends according to the present invention were well suited for the purpose and eliminated the interruptions in the automatic stuffing operations heretofore caused by the loose ring of compacted casing.

Having described the invention in detail, what is claimed as new is:

1. A method of forming an end face of a shirred casing stick to a desired profile comprising the steps of:
   (a) providing a shirred stick composed of generally conical pleats of shirred cellulosic casing nested tightly together, the pleat inner folds defining a shirred stick axial bore opening through said end face;
   (b) positioning a tool surface spaced from and in axial alignment with said end face, the tool surface being a negative to the desired profile and including a central pilot insertable into the stick bore;
   (c) moving said tool surface and stick axially together thereby introducing said pilot into said bore and pressing said tool surface against said end face;
   (d) spinning the tool surface and pilot relative to said stick in one direction about the longitudinal axis of the stick bore while maintaining a pressing relationship between the tool surface and said end face sufficient for both burnishing said end face to a profile which is substantially a positive reproduction of said tool surface and burnishing said pleat inner folds adjacent the opening of said bore through said end face; and
   (e) continuing said spinning while axially separating the tool surface and stick.

2. A method as in claim 1 wherein said burnishing is performed exothermically.

3. A method as in claim 2 wherein said tool surface is part of a heat sink.

4. A method as in claim 1 wherein said shirred stick has a ring of compacted casing loose from the last-shirred of said tightly nested pleats and said burnishing forms said ring of loose casing to a burnished surface of revolution coherent with said last-shirred tightly nested pleats.

5. A method as in claim 1 including chamfering the opening of said bore through said end face.

6. A method as in claim 1 including spinning said tool surface at about 2500 RPM to 2900 RPM.

7. A method as in claim 1 including:
   (a) spinning said tool surface at about 2500 RPM to 2900 RPM;
   (b) pressing said spinning tool surface against said end face with a force of about 35 to 50 gms/mm$^2$; and
   (c) axially separating said spinning surface and stick after about 3 to 4 seconds.

8. A method as in claim 1 including supporting said stick while maintaining an end portion thereof including said end face unsupported.

9. A method as in claim 8 wherein supporting said stick is accomplished by positioning said stick on support member extending into the bore of said stick.

10. A method as in claim 1 wherein said end face has a flap of casing thereon and, at step (d), burnishing said flap together with said pleat inner folds to a smooth coherent surface adjacent the opening of said bore through said end face.

11. A method as in claim 1 including commencing said spinning prior to moving said tool surface and stick axially together.

12. A shirred stick of cellulosic casing having an axial bore which opens through an end face of said stick, said stick being composed of generally conical pleats of shirred casing nested tightly together each of said pleats having an inner fold which defines the surface of said bore and an outer fold which defines the outer surface of said stick wherein the improvement comprises:
   said end face and said bore surface adjacent said end face constituting portions of a smooth burnished surface of revolution having as its axis of rotation the longitudinal axis of said bore.

13. A shirred stick as in claim 12 wherein said end face is composed of casing loose from said tightly nested pleats which loose casing is made coherent to said tightly nested pleats by burnishing to exothermically form said burnished surface of revolution.

14. A shirred stick as in claim 12 wherein said end face is generally convex.

15. A shirred stick as in claim 12 wherein said burnished surface of revolution extends to said stick outer surface.

16. A shirred stick as in claim 12 wherein the opening of said bore through said end face comprises a smooth unbroken chamfered edge.

17. A shirred stick as in claim 12 wherein said bore surface adjacent said end face has a flap of casing burnished together with said pleat inner folds to form a portion of said smooth burnished surface of revolution.

18. A shirred stick of cellulosic casing composed of pleats of casing nested tightly one against another, the inner folds of which define an axial bore through said stick, said stick having loose casing at its last-shirred end which is formed to a burnished surface of revolution coherent with the tightly nested pleats at said last-shirred end, the longitudinal axis of said bore being the axis of rotation for the generation of said burnished surface; and said burnished surface of revolution including a portion of said bore surface adjacent said last-shirred end.

19. A shirred stick as in claim 18 wherein said pleats are substantially conical and said loose casing and conical pleats at said last-shirred end are exothermically formed by burnishing to a smooth coherent surface.

20. A shirred stick as in claim 18 wherein the opening of said bore through said last-shirred end is a chamfered edge.

21. A shirred stick as in claim 20 wherein said chamfered edge constitutes a portion of said burnished surface of revolution.

22. Apparatus for forming an end face of a shirred stick to a desired profile, the stick having an axial bore opening through said end face, and said apparatus comprising;

(a) a tool rotatable about a central axis, said tool having a surface which is symetrical about said axis and is substantially a negative image to the desired profile to be formed;

(b) a central pilot extending axially from said surface and insertable into the bore opening of a said stick;

(c) means for spinning said tool and pilot in one direction about said central axis; and (d) means for pressing said surface and stick end face axially together to burnish said stick end face to a surface of revolution having said axis as its axis of rotation.

23. Apparatus as in claim 22 wherein said tool comprises a heat sink.

24. Apparatus as in claim 22 wherein said pilot is tapered to provide the bore opening of said stick with a chamfered edge.

* * * * *